United States Patent
Braukmann et al.

(10) Patent No.: US 9,151,340 B1
(45) Date of Patent: Oct. 6, 2015

(54) CLUTCH WITH AUTO-STOP

(71) Applicant: Kit Masters, Perham, MN (US)

(72) Inventors: Jake Braukmann, Perham, MN (US); Daniel Huwe, Sebeka, MN (US); Thomas Jagger, Golden Valley, MN (US)

(73) Assignee: KIT MASTERS, Perham, MN (US)

( * ) Notice: Subject to any disclaimer, the term of this patent is extended or adjusted under 35 U.S.C. 154(b) by 0 days.

(21) Appl. No.: 14/513,351

(22) Filed: Oct. 14, 2014

(51) Int. Cl.
*F16D 25/08* (2006.01)
*F16D 13/22* (2006.01)
*F16D 13/24* (2006.01)
*F16D 13/30* (2006.01)
*F16D 125/08* (2012.01)

(52) U.S. Cl.
CPC .............. *F16D 25/082* (2013.01); *F16D 13/22* (2013.01); *F16D 13/24* (2013.01); *F16D 13/30* (2013.01); *F16D 2125/08* (2013.01)

(58) Field of Classification Search
CPC ....... F16D 25/063; F16D 13/22; F16D 13/24; F16D 25/0632; F16D 2125/08
See application file for complete search history.

(56) References Cited

U.S. PATENT DOCUMENTS

| | | | |
|---|---|---|---|
| 8,360,219 | B2 | 1/2013 | Swanson |
| 2007/0023253 | A1 * | 2/2007 | Wayman |
| 2011/0180362 | A1 | 7/2011 | Swanson |
| 2011/0259699 | A1 | 10/2011 | Swanson |
| 2012/0164002 | A1 | 6/2012 | Roczniak et al. |

OTHER PUBLICATIONS

Kysor K30 Product Sheet http://www.borgwarner.com/en/Thermal/products/Literature/Kysor%20K30%20Product%20Sheet.pdf , Oct. 8, 2015 (previously submitted on Oct. 14, 2014 but not considered).
Kit Masters Auto Lock Flyer http://www.kit-masters.com/content_53.php , Oct. 8, 2015 (previously submitted on Oct. 14, 2014 but not considered).
Kit Masters Auto Lock Flyer http://www.kit-masters.com/files/file/Auto%20Lock%20Flyer.pdf , Oct. 8, 2015 (previously submitted on Oct. 14, 2014 but not considered).

* cited by examiner

*Primary Examiner* — Rodney H Bonck
(74) *Attorney, Agent, or Firm* — Oblon, McClelland, Maier & Neustadt, L.L.P.

(57) ABSTRACT

A clutch device for a clutch system has a nose cap and a piston that is movable in an axial direction with respect to the nose cap. A seal disposed in the axial direction between the nose cap and the piston automatically locks the clutch device when a threshold amount of wear has accrued in a friction interface of the clutch device. If the seal is not compressed in the axial direction, then a pressurized fluid can flow past the seal and the piston is displaced in the axial direction away from the nose cap. If the seal is compressed in the axial direction, then the pressurized fluid does not flow past the seal and the piston is not displaced in the axial direction away from the nose cap.

19 Claims, 9 Drawing Sheets

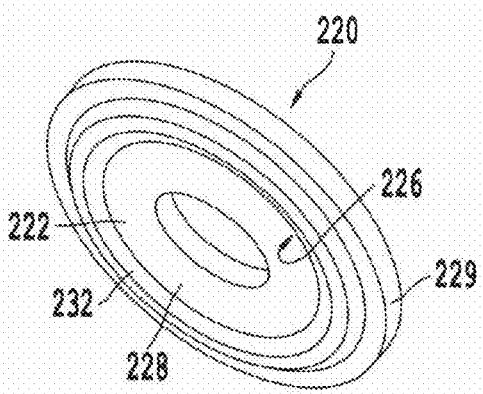
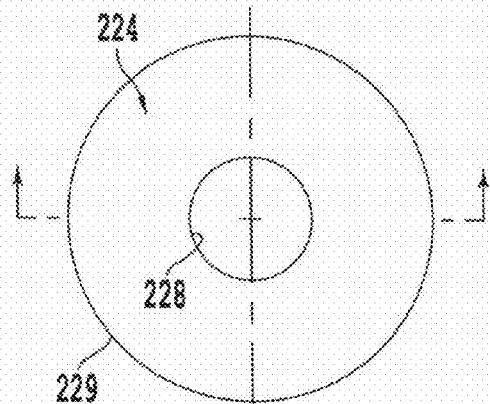
Fig. 8    Fig. 9
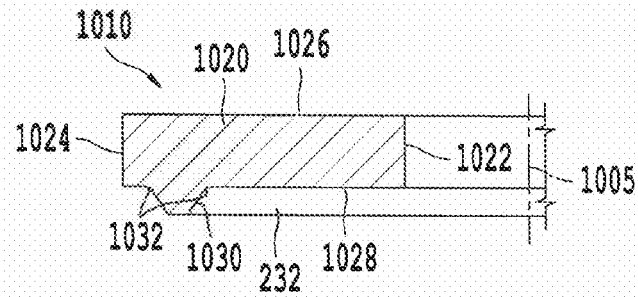
Fig. 10
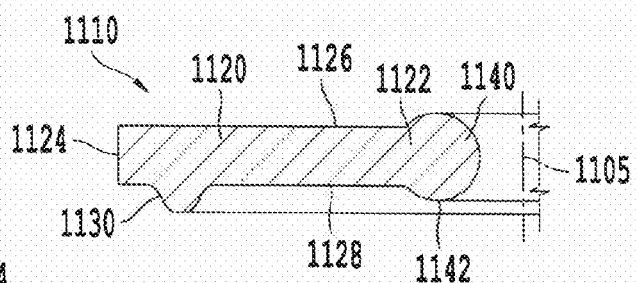
Fig. 11
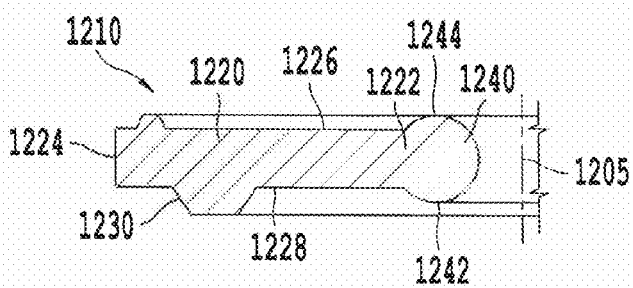
Fig. 12
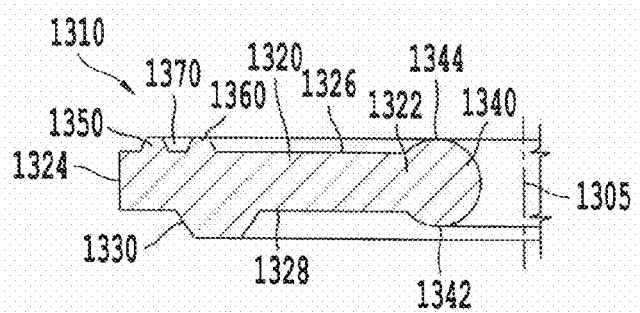
Fig. 13

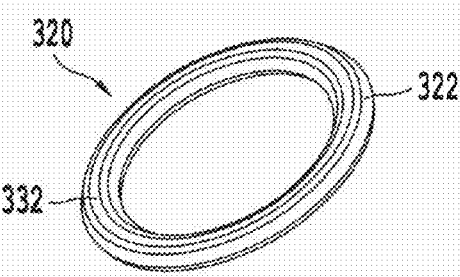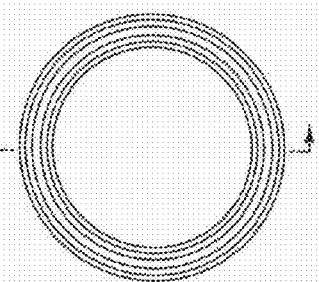
*Fig. 15*  *Fig. 16*
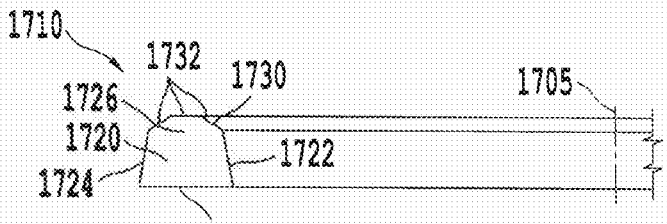
*Fig. 17*
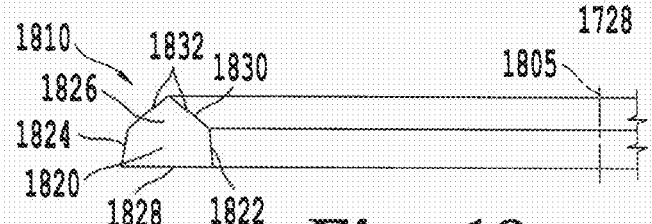
*Fig. 18*
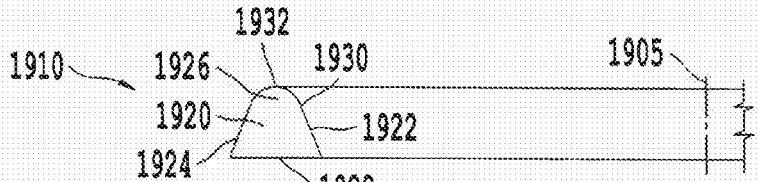
*Fig. 19*
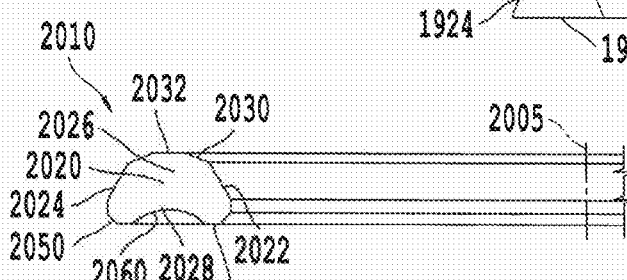
*Fig. 20*
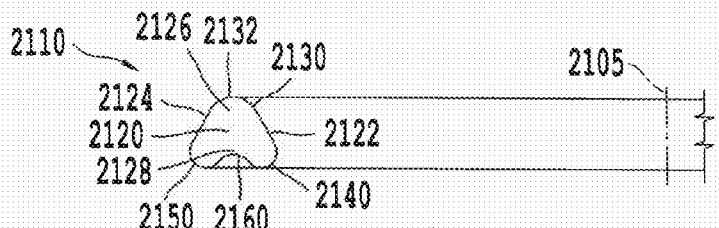
*Fig. 21*

CLUTCH WITH AUTO-STOP

BACKGROUND

Vehicle transmission systems, cooling systems, and braking systems may employ clutches or like devices to selectively transmit rotational forces from a drive source to an output member. For example, some cooling systems employ fan clutch devices that control the output rotation of engine cooling fans. Such a fan clutch device may be driven by a drive pulley that rotates in response to the vehicle engine.

In general, a clutch device can be operated to engage (or disengage) opposing clutch surfaces, which rotationally interconnect (or rotationally disconnect) the drive pulley and the output member. In an example related to fan clutches, when the clutch is shifted to the engaged position, friction surfaces engage and the output member (carrying fan blades) is driven to rotate along with the drive pulley. Over time, the friction surface may become worn, requiring replacement.

When a clutch is in a new condition, a gap of a predetermined size may exist between the clutch surfaces when they are in their disengaged position. To engage, the clutch surfaces may require a displacement corresponding to the size of the gap. Over time, repeated engagement and disengagement motions by the clutch surfaces may lead to wear. Such wear can be a normal and even a desirable aspect of the operation of a friction clutch device. For example, a wear member may be used where it is preferable to minimize wear on other components for reasons such as cost or complexity of replacement. On the other hand, the amount of wear that can be tolerated in a clutch system may also depend on considerations such as safety and available clearance space. For example, it may be important to avoid interference between parts of the clutch mechanism or movements outside the intended range of motion of the clutch mechanism. Accordingly, it may be desirable to have means for accommodating wear in the clutch surfaces of a clutch device, while also preventing the clutch from disengaging (or alternatively, preventing the clutch from engaging) when an unacceptable degree of wear has accrued.

In some cases, the fan clutch in a vehicle may become inoperable due to wearing of the friction surfaces. For example, in some conventional fan clutch devices, a friction clutch ring may be unable to engage an opposing friction surface when the friction clutch ring is worn below a threshold thickness. Accordingly, the fan clutch device may be unable to force engagement of the friction surfaces and the fan blades are not driven to rotate (e.g., no cooling airflow is provided). Due to the lack of cooling airflow, the vehicle's engine may overheat or otherwise become highly inefficient.

These conventional fan clutch devices are typically supplied with a set of "come home" bolts for separate storage by the vehicle operator, e.g., placement in the vehicle cabin for use at a much later time. Thus, after a period of years when the friction ring of the fan clutch device is worn down below a threshold level so that the friction surfaces are no longer able to engage, the vehicle operator must attempt to locate the "come home" bolts that were stored years earlier. If the "come home" bolts are located, the vehicle operator must then attempt to install the bolts to the fan clutch device in the engine compartment. In general, the "come home" bolts are installed onto the outer periphery of the clutch device so as to temporarily bolt the output member to the input member, thereby causing permanent rotation of the fan blades until the vehicle can be driven to a repair facility. For vehicles such as large semi-trucks or buses, the installation of the "come home" bolts may occur on the side of the road if the fan clutch fails during a long journey.

SUMMARY

According to an embodiment, a clutch device with an auto-stop seal can prevent a friction interface of the clutch device from disengaging when a friction ring of the friction interface has worn down below a threshold thickness. The clutch device may include a nose cap attached to a front end of a central shaft oriented along an axis. The central shaft may have a coupling end opposite the front end. A fluid channel may allow a pressurized fluid such as hydraulic oil or air supplied to the coupling end to flow from the coupling end, through the fluid channel, and out a fluid passage located toward the front end of the central shaft.

A piston may be slidingly mounted on the central shaft. A front bearing may rotatingly couple an output member to the piston so that the output member is constrained to translate in the axial direction with the piston, while being substantially free to rotate relative to the piston. A friction ring may be fixed to rotate with the output member. A rear bearing may rotatingly couple an input member to the central shaft so that the input member is substantially free to rotate relative to the central shaft. The input member may be driven to rotate by a drive member connected to a power source such as a motor or an engine.

The output member can shift axially into an engaged position in which an engagement surface of the friction ring engages with an opposing friction surface of the input member, thereby causing the output member to rotate with the input member. An output instrument, such as a fan blade device, may be mounted on the output member so that the output instrument is driven to rotate when the output member is in the engaged position. The output member can shift axially into a disengaged position in which there is a space between the engagement surface of the friction ring and the opposing friction surface of the input member, thereby allowing the output member to rotate relative to the input member.

A spring may urge the piston toward the nose cap. The friction ring and the input member may form a frusto-conical friction interface such that the spring urges the piston forward toward the engaged position.

A wall portion of the nose cap may abut a periphery of the piston, in which a single piece integrated seal/wiper is mounted. The piston and the nose cap may enclose a volume called a fluid receiving chamber. When the fluid receiving chamber is filled with a pressurized fluid, the pressurized fluid may exert a force on the piston, urging the piston in the axially rearward direction, opposite the force of the spring, thereby urging the output member toward the disengaged position.

An auto-stop seal may be disposed within the fluid receiving chamber, axially clamped between the rear face of the nose cap and a shoulder portion of the central shaft. Installed in this way, the auto-stop seal may prevent the pressurized fluid from leaking out a central opening in the nose cap.

In the radial direction with respect to the axis, the auto-stop seal may also surround the fluid passage comprised in the central shaft. As wear accrues in the friction interface of the clutch device, a corresponding distance between the front face and the rear face may be reduced. The auto-lock seal may have a height corresponding to a predetermined distance in the axial direction. When the distance between the rear face of the nose cap and the front face of the piston in the axial direction is greater than the predetermined distance, the auto-lock seal may not be compressed in the axial direction between the front face and the rear face, and thereby allowing the pressurized fluid to flow past the seal into the fluid receiving chamber, displacing the piston in the axial direction away from the nose cap. On the other hand, when a distance between the rear face of the nose cap and the front face of the piston in the axial direction is less than or equal to the predetermined distance, the auto-lock seal may be compressed in the axial direction between the front face and the rear face, thereby preventing the pressurized fluid from flowing past the seal into the fluid receiving chamber. Thus, the auto-stop seal may lock the piston, thereby locking the clutch device in the engaged position, automatically preventing the clutch device from disengaging after a predetermined threshold amount of wear has accrued in the friction ring.

In one embodiment, the auto-stop seal may have a substantially toroidal body defined by a cross-sectional area revolved about an axis of revolution. The cross-sectional area may include a generally rectangular region having a radially inward end located toward the axis of revolution, a radially outward end located away from the axis of revolution, and front and rear edges that connect the radially inward and radially outward ends.

In some embodiments, the cross-sectional area may also include a rear ridge profile that extends from the rear edge on a portion of the rear edge located toward the radially outward end.

In some embodiments, the cross-sectional area may also include a generally circular region having a diameter greater than a height in the axial direction of the generally rectangular region between the front and rear edges. The generally circular region may be located toward the radially inward end such that the front and rear edges intersect the generally circular region. A rear curve of the generally circular region may extend in the axial direction beyond the rear edge such that the rear ridge profile extends from the rear edge further in the axial direction than the rear curve extends beyond the rear edge. A front curve of the generally circular region may extend in the axial direction beyond the front edge.

In some embodiments, the cross-sectional area may also include a first front ridge profile that extends from the front edge on a portion of the front edge located toward the radially outward end. The first front ridge profile may extend from the front edge in the axial direction a distance substantially equal to a distance by which the front curve of the generally circular region extends in the axial direction beyond the front edge.

In some embodiments, the cross-sectional area may also include a second front ridge profile that extends from the front edge. The second front ridge profile may extend from the front edge in the axial direction a distance substantially equal to the distance by which the front curve of the generally circular region extends in the axial direction beyond the front edge. A portion of the cross-sectional area located radially between the first and second front ridge profiles may define a concave profile.

Thus, in an embodiment, the auto-lock seal may be the same seal that prevents the pressurized fluid from leaking out the central opening in the nose cap. Accordingly, converting a clutch device to include the auto-stop feature may involve replacing a seal with a seal in accordance with an embodiment. According to other embodiments, converting a clutch device to include the auto-stop feature may include replacing an existing piston with a piston and a seal in accordance with an embodiment, or replacing an existing nose cap with a nose cap and a seal in accordance with an embodiment.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8 is a perspective view of a seal according to the first embodiment of the clutch device.

FIG. 9 is a top view of the seal of FIG. 8.

FIG. 10 is a cross-sectional view of the seal of FIGS. 8 and 9.

FIG. 11 is a cross-sectional view of a seal according to another embodiment.

FIG. 12 is a cross-sectional view of a seal according to another embodiment.

FIG. 13 is a cross-sectional view of a seal according to another embodiment.

FIG. 15 is a perspective view of a seal according to the second embodiment of the clutch device.

FIG. 16 is a top view of the seal of FIG. 15.

FIG. 17 is a cross-sectional view of the seal of FIGS. 15 and 16.

FIG. 18 is a cross-sectional view of a seal according to another embodiment.

FIG. 19 is a cross-sectional view of a seal according to another embodiment.

FIG. 20 is a cross-sectional view of a seal according to another embodiment.

FIG. 21 is a cross-sectional view of a seal according to another embodiment.

DETAILED DESCRIPTION OF EMBODIMENTS

Figure 1:
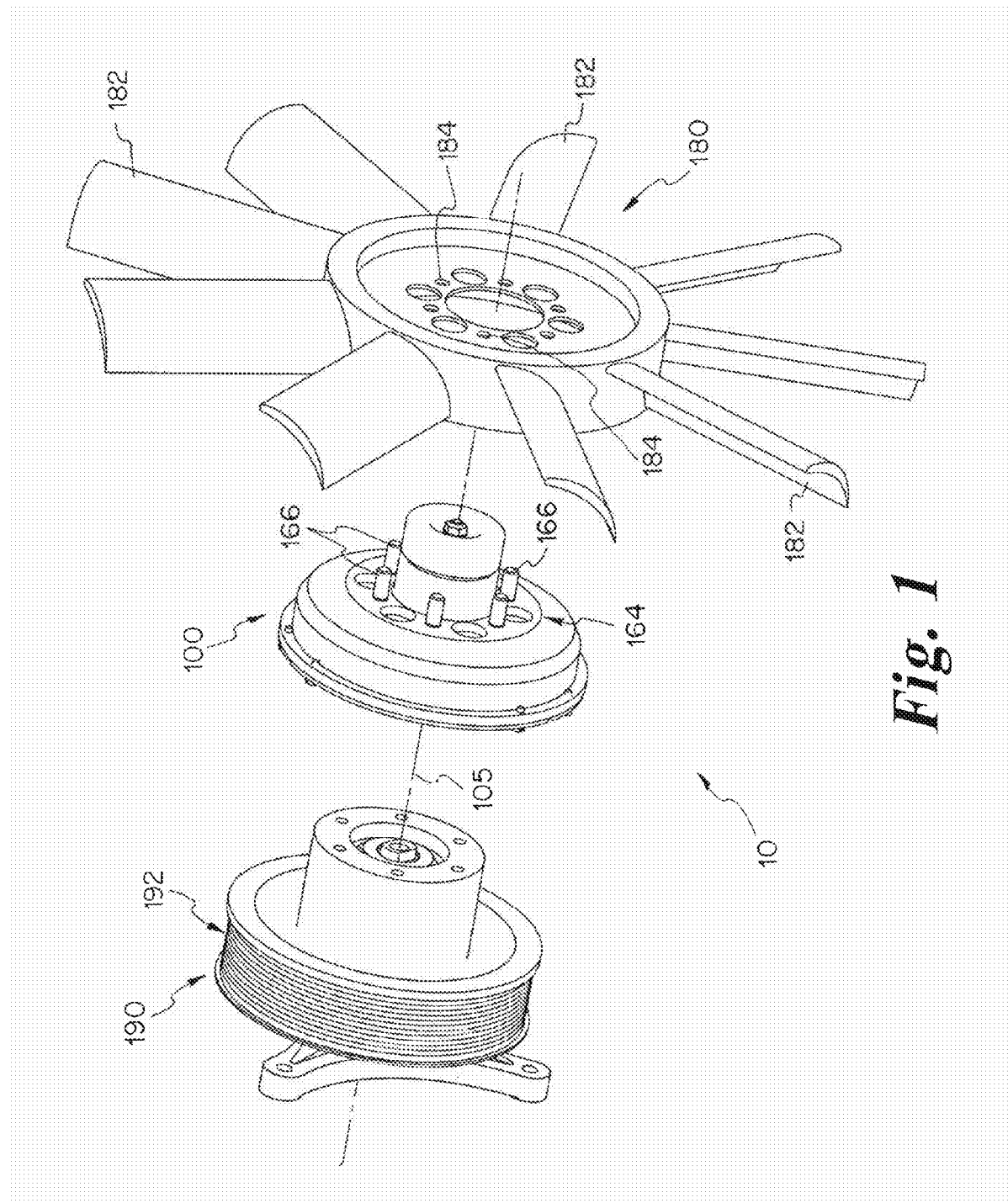
FIG. 1 is a perspective exploded view of a fan clutch system including a clutch device coupled between a fan blade device and a drive member, in accordance with some embodiments.

Referring now to the drawings, like reference numerals designate identical or corresponding parts throughout the several views.

Figure 2:
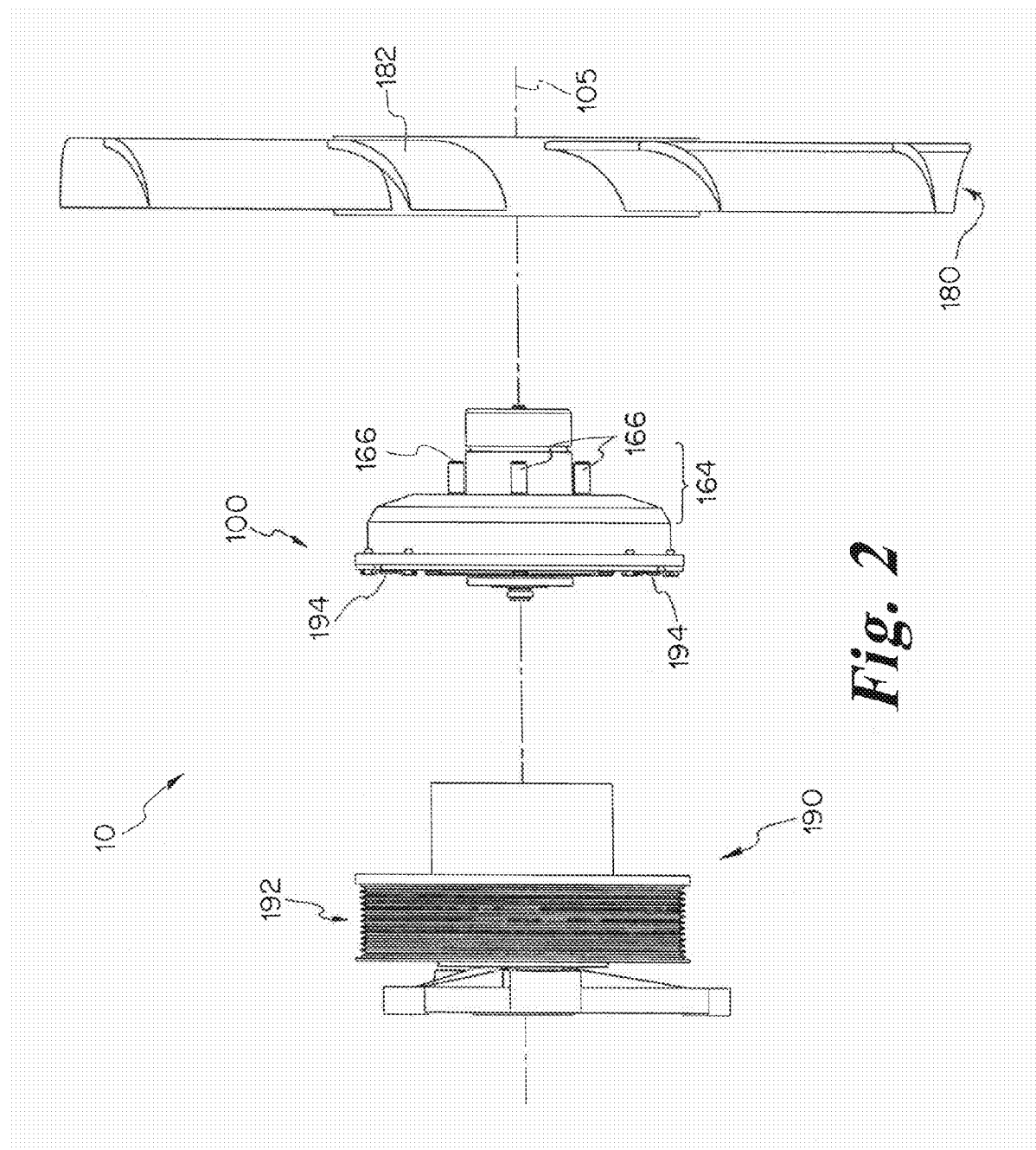
FIG. 2 is a side exploded view of the fan clutch system of FIG. 1.
Figure 3:
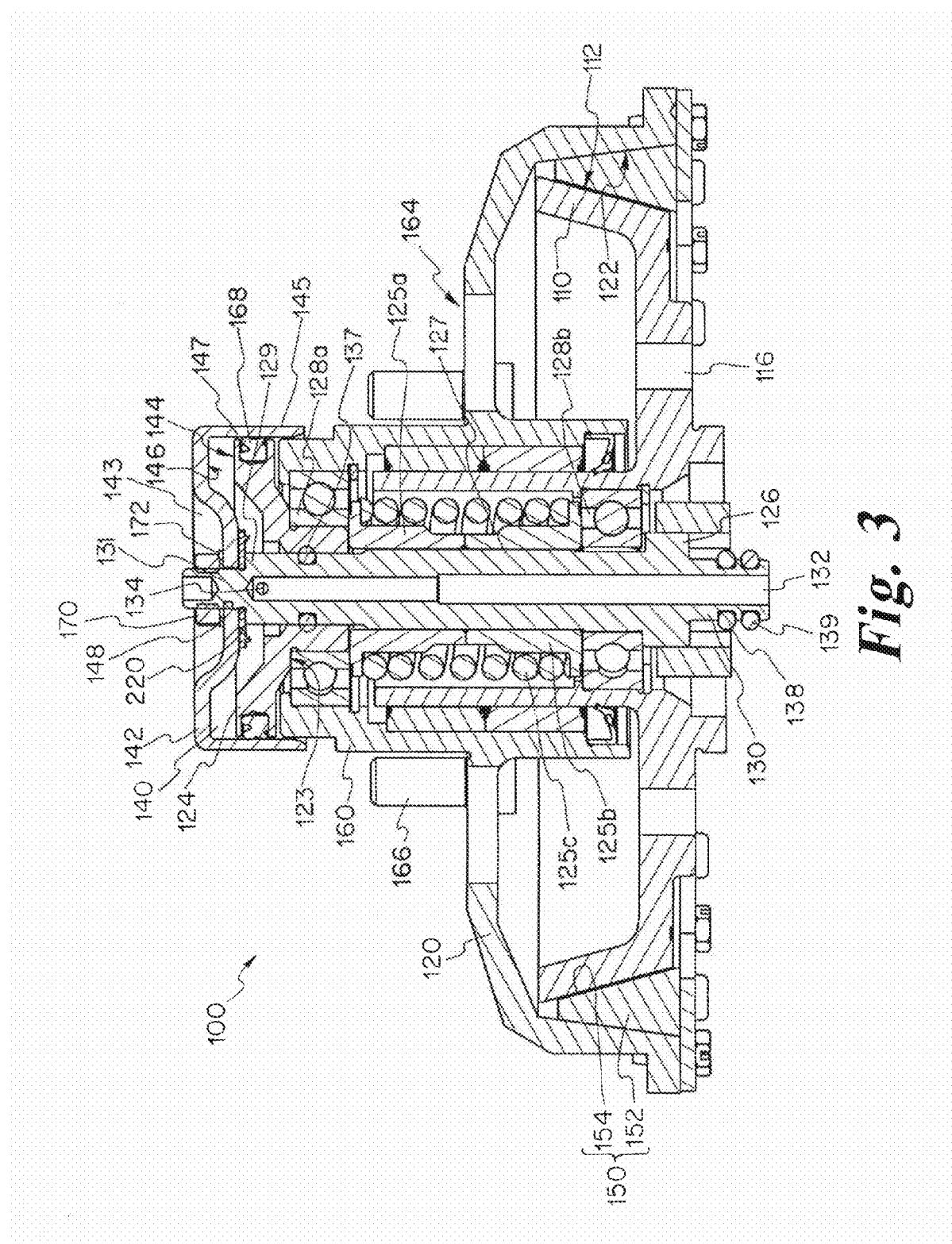
FIG. 3 is a cross-sectional side view of a first embodiment of the clutch device of the clutch system of FIG. 2.

Referring to FIGS. 1-3, some embodiments of a clutch system 10 may include a clutch device 100 that couples an output instrument such as a fan blade device 180 to a drive pulley 190. The drive pulley 190 may be driven to rotate about a central axis 105 via a belt connection 192 with a component of a vehicle engine. As such, the clutch system may be assembled into a vehicle, such as near the front of a semi-truck or near the rear of a passenger bus.

As described in more detail below, some embodiments of the clutch device 100 can include an input member 110 and an output member 120 (as illustrated in FIG. 3). Turning to FIG. 2, the input member 110 of FIG. 3 can be mounted to the drive pulley 190 via mounting bolts 194 so that the input member 110 is rotationally coupled with the drive pulley 190. Returning to FIG. 3, the input member 110 can be selectively coupled to the output member 120 by a frictional drive system 150 so as to rotatingly drive the output member 120 at a first speed. In such circumstances, the clutch device 100 can be controlled to provide rotational control, for example, to an output instrument such as the fan blade device 180 (as illustrated in FIGS. 1 and 2) of an engine cooling system in the vehicle. Accordingly, as shown in FIG. 3, the fan blade device 180 can be operated at the first speed when a friction ring 152, affixed to the output member 120 at an output surface 122 via mounted bolts (not shown), is axially shifted to engage an engagement surface 154 of the friction ring 152 against an opposing friction surface 112 to thereby rotate with the drive pulley 190 or other drive source.

In operation, the clutch system 10 may include a drive source such as the drive pulley 190 that is rotated at a first speed due to connection with an engine output shaft via a belt, chain, gear, or the like. The clutch device 100, as illustrated in FIG. 3, may include the input member 110 that is directly or indirectly mounted to the drive pulley 190 so as to rotate at the first speed with the drive pulley 190. In this embodiment, the input member 110 may include two or more mounting holes 116 to receive mounting bolts 194 (as illustrated in FIG. 2) that couple the input member 110 to the drive pulley 190. The clutch device 100 may also include the output member 120 that may be actuated to engage or disengage with the input member 110. For example, the output member 120 may axially shift in response to a movement of a piston 124 that is adjustable relative to the input member 110. The axial movement of the output member 120 may cause the friction ring 152 to axially shift into frictional engagement or disengagement with the friction surface 112 on the input member 110. When the friction ring 152 is shifted to the engaged position, the output member 120 may be urged to rotate at the first speed with the input member 110 and the drive pulley 190. Because the fan blade device 180 may be mounted to a front face of the output member 120 (e.g., via two or more mounting studs 166 or another removable coupling mechanism), the fan blade device 180 may likewise rotate at the first speed with the input member 110 and the drive pulley 190 when the friction ring 152 (coupled to the output member 120) frictionally engages the input member 110.

The friction ring 152 (including the engagement surface 154) and the input member 110 (including the friction surface 112), in some embodiments, may be generally defined by a frusto-conical friction interface in which the radius of the frusto-conical friction interface increases as the frusto-conical friction interface extends away from the drive pulley 190. Conversely, the radius of the frusto-conical friction interface may increase as the frusto-conical friction interface extends towards the drive pulley 190. The friction ring 152 may comprise a metallic, ceramic, or other material or combination of materials that is capable of providing frictional engagement and is capable of dissipating heat generated at the frictional interface. The shape and orientation of the frusto-conical friction ring 152 and the friction surface 112 may provide the clutch device 100 with a conical wedging action. This conical wedging action may improve the engagement friction, thereby providing enhanced torque transfer capabilities. In other implementations, the friction ring 152 and the friction surface 112 may be defined by a substantially flat friction interface.

Referring again to FIGS. 1 and 2, in the illustrated embodiment the drive pulley 190 may be rotatably coupled to a support shaft (not shown) by one or more bearings (not shown). This support shaft may include a central channel (not shown) that is used to deliver a pressurized fluid (not shown) to the clutch device 100. According to an embodiment, as illustrated in FIG. 3, the clutch device 100 may include a central shaft 126 having a coupling end 130 for insertion into a mating region of the drive pulley 190. This coupling end 130 may be abutted between a rear bearing 128b the drive pulley 190 and may provide a generally airtight seal so that the pressurized fluid delivered through the support shaft of the drive pulley 190 is advanced through a fluid channel 132 of the clutch device 100 and into a fluid receiving chamber 140 at least partially defined by the piston 124. As such, when the clutch device 100 is mounted to the drive pulley 190, the coupling end 130 may be pressed into the central channel of the drive pulley 190 so as to provide fluid communication with a fluid supply reservoir (not shown).

As shown in FIG. 3, in some embodiments, the coupling end 130 may include a dual seal arrangement so as to provide enhanced sealing features at the interface between the clutch device 100 and the drive pulley 190. In particular, the coupling end 130 may include a first sealing ring 138 comprising a first polymer material. The coupling end 130 may also include a second sealing ring 139 comprising a second polymer material that is significantly stiffer (e.g., having a higher durometer rating) than the first polymer material of the first sealing ring 138. Such an arrangement of the first and second sealing rings 138 and 139 along the coupling end 130 of the clutch device 100 may reduce the likelihood of clutch failure during operation of the vehicle. For example, the clutch device 100 may continue to operate in a satisfactory manner even if one of the two sealing rings 138 and 139 ruptures or leaks after extended wear. The fluid transmitted to or withdrawn from the fluid receiving chamber 140 of the clutch device 100 may be any suitable liquid or gas. Such fluids may be received, for example, from a pneumatic air supply system (not shown) or a hydraulic oil supply system (not shown).

The fluid receiving chamber 140 may be at least partially defined by a front face 144 of the piston 124 and a rear face 146 of a nose cap 142. The nose cap 142 may have a recessed portion 143 with a central opening 148 through which a forward end 131 of the central shaft 126 may protrude. The nose cap 142 may also have a wall portion 145 that may have a cylindrical shape, for example, as illustrated in FIG. 3. In another embodiment, a nose cap may be comprised of several physically distinct members, for example, a wall portion of the nose cap need not be formed integrally with a front portion of the nose cap. In still other embodiments, a wall portion may be comprised in a piston, for example, rather than in a nose cap.

Still referring to FIG. 3, the nose cap 142 may be removably mounted to the forward end 131 of the central shaft 126, thus remaining generally fixed relative to the stationary central shaft 126. According to an embodiment shown in FIG. 3, a locknut 170 may be used to secure the nose cap 142 to the forward end 131 of the central shaft 126. The forward end 131 may have a threaded portion to engage with threads in the locknut 170. A star washer 172 may be used to secure the nose cap 142 to the forward end 131 of the central shaft 126. In other embodiments, alternative fastening means may be used, for example, a nut and a lock washer, a locknut having an integral locking portion, or a nut and a through-hole made to interlock with a formed wire fastener, for example.

When the pressurized fluid is delivered into the fluid receiving chamber 140, the piston 124 may adjust a small distance in an axially rearward direction relative to the nose cap 142 and the central shaft 126. A single piece integrated seal/wiper 168 may be arranged proximate to an outer periphery 147 of the piston 124 so as to seal a leak path between the outer periphery 147 of the piston 124 and the wall portion 145 of the nose cap 142. In other embodiments, as illustrated for example in FIG. 14, a seal ring 368 and a separate dust wiper 367 may be used in place of the single piece integrated seal/wiper 168.

Referring again to FIG. 3, a seal 220 may be disposed in the axial direction between the rear face 146 of the nose cap 142 and the front face 144 of the piston 124 and in a radial direction surrounding a fluid passage 134 of the central shaft 126. The seal 220 is discussed in greater detail below, and with respect to a first embodiment illustrated in FIGS. 6-13, a second embodiment illustrated in FIGS. 14-21, and a third embodiment illustrated in FIG. 22.

Still referring to FIG. 3, a rear surface 123 of the piston 124 may abut with a forward bearing 128a, which is axially adjustable with the piston 124. The forward bearing 128a may be mounted to a first spring-engaging member 125a, which slidably translates along the central shaft 126 relative to a second spring-engaging member 125b. A bias member such as a spring 125c may be arranged between the first and second spring engaging members 125a-b and may bias the forward bearing 128a and the piston 124 toward the nose cap 142 at the front of the clutch device 100. Thus, when the pressurized fluid is delivered into the fluid receiving chamber 140, the piston 124, the forward bearing 128a, the first spring-engaging member 125a, and the output member 120 may adjust a small distance in an axially rearward direction against the bias force of the spring 125c. When the pressurized fluid is evacuated from the fluid receiving chamber 140, the spring 125c may urge the piston 124, the forward bearing 128a, the first spring-engaging member 125a, and the output member 120 to return to an axially forward position. As described below, this reciprocating motion may cause the friction ring 152 to adjust into and out of engagement with the input member 110. In some embodiments, two or more springs may be used in the place of the spring 125c.

Still referring to FIG. 3, the second spring-engaging member 125b may abut with the rear bearing 128b, which may also abut on an opposite side with a collar 127 of the central shaft 126. Accordingly, the rear bearing 128b may remain generally axially stationary with the central shaft 126 while the forward bearing 128a may axially adjust relative to the central shaft 126 (as previously described). In some embodiments, a seal, such as an o-ring seal 137, may be disposed between the central shaft 126 and the piston 124.

Still referring to FIG. 3, the input member 110 may be mounted on the rear bearing 128b so that the input member 110 is rotatable relative to the central shaft 126 but remains axially stationary relative to the central shaft 126. The output member 120 may be mounted on the forward bearing 128a so that the output member 120 is rotatable relative to the central shaft 126 and is axially adjustable relative to the central shaft 126 when the piston 124 and forward bearing 128a are axially shifted.

Still referring to FIG. 3, in some embodiments, the output member 120 of the clutch device 100 may include a central hub region 160 and a fan-mounting region 164. When the pressurized fluid is provided in the fluid channel 132, the fluid receiving chamber 140 may be pressurized and the piston 124 may be urged against the force of the spring 125c, causing the forward bearing 128a to adjust in an axially rearward direction. The output member 120, which is mounted on the forward bearing 128a, may axially adjust in the rearward direction along with the forward bearing 128a. As shown in FIG. 3, this rearward axial adjustment of the output member 120 may create a narrow gap between the engagement surface 154 of friction ring 152 and the friction surface 112, thereby permitting the output member 120 to rotate relative to the input member 110. When the pressurized fluid is evacuated from the fluid receiving chamber 140, the piston 124, the forward bearing 128a, and the output member 120 may be urged by the spring 125c in the axially forward direction, which causes the friction ring 152 to press against the opposing friction surface 112, coupling the output member 120 to the input member 110.

Referring again to FIGS. 1 and 2, the fan-mounting region 164 of the output member 120 may be configured to receive a fan blade device 180 or another output instrument to be rotated. In particular, the fan-mounting region 164 may include two or more mounting studs 166 that may be configured to receive the fan blade device 180. As shown in FIGS. 1 and 2, the fan blade device 180 may be configured to fit over the central hub region 160 of the output member 120 and engage with the fan-mounting region 164. The fan blade device 180 may include a plurality of fan blade structures 182 that are arranged to generate air flow, for example, as part of a vehicle's engine cooling system. The fan blade structures 182 may be angled, tapered, curved, or otherwise configured to direct the output of air flow. In the illustrated embodiment of FIG. 1, the fan blade device 180 may include two or more mounting holes 184 that are configured to receive the mounting studs 166 extending from the clutch device 100. In alternative embodiments, the output member 120 of the clutch device 100 may be configured to receive an output instrument other than a fan blade device 180. For example, the fan-mounting region 164 may be configured to connect with other components that are to be selectively rotated, such as output shafts, gears, brake systems, and the like. Accordingly, the output member 120 may serve as both the component that shifts friction ring 152 to engage or disengage the input member 110 and the component that receives an output instrument (such as the fan blade device 180 in FIGS. 1 and 2).

In some embodiments of the clutch device 100, when the fan blade device 180 spins during engagement, it may produce a thrust component substantially in the same direction as the spring force. This thrust component may increase the overall frictional force between the input and output members 110 and 120, which may increase the torque of the output member 120. In selective embodiments, the thrust component from the rotation of the fan blade device during the engagement of the clutch device 100 may depend on the number of fan blades, diameter of the fan blade device, and the first speed. For example, in some non-limiting embodiments, the fan blade device may have from 5 to 11 fan blades. In other embodiments, the fan blade device may have fewer than 5 fan blades. In still other embodiments, the fan blade device may have greater than 11 fan blades. In various embodiments, the diameter of the fan blade device may range from about 20 inches to about 30 inches, about 25 inches to about 35 inches, or about 30 inches to about 40 inches, for example. In an embodiment, the diameter of the fan blade device may be about 36 inches, for example. Increasing the number of fan blades, the diameter of the fan blade device, or both, may lead to a higher thrust component. Also, during the engagement of the clutch device, the first speed of the fan blade device may be substantially similar to a rotational speed of the drive pulley 190, which may vary according to a rotational speed of the engine output shaft. Increasing the first speed may increase the thrust component.

Referring again to FIG. 3, one or both of the input member 110 and the friction ring 152 may be subject to wear due to the frictional interaction of the engagement surface 154 of the friction ring 152 with the opposing friction surface 112 of the input member 110. In an embodiment, the friction ring 152 may be made of a softer material than the input member 110, thereby resulting in comparatively more wear over time in the friction ring 152 than in the input member 110.

As wear occurs between the friction ring 152 and the opposing friction surface 112, the wear may accumulate in a direction normal to the engagement surface 154, resulting in a wear component in the axial direction. In an embodiment wherein the engagement surface 154 of the friction ring 152 has an orientation such that the axial direction is normal to the engagement surface 154, substantially the entire wear component may be in the axial direction.

Figure 4:
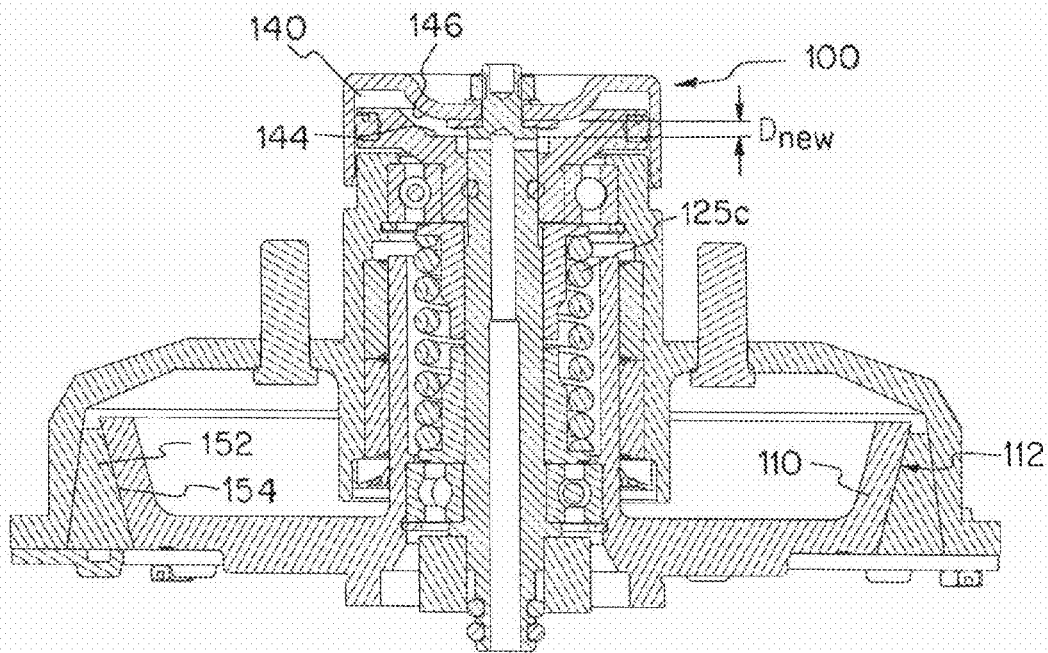
FIG. 4 is a cross-sectional side view of the clutch device of FIG. 3.

Referring now to FIG. 4, when the fluid receiving chamber 140 is not pressurized, the clutch device 100 may be engaged, with the force of the spring 125c pushing the engagement surface 154 into the opposing friction surface 112. When the clutch device 100 is in a new condition and the clutch device 100 is engaged, a space D of length $D_{new}$ may exist in the axial direction between the front face 144 and the rear face 146.

Figure 5:
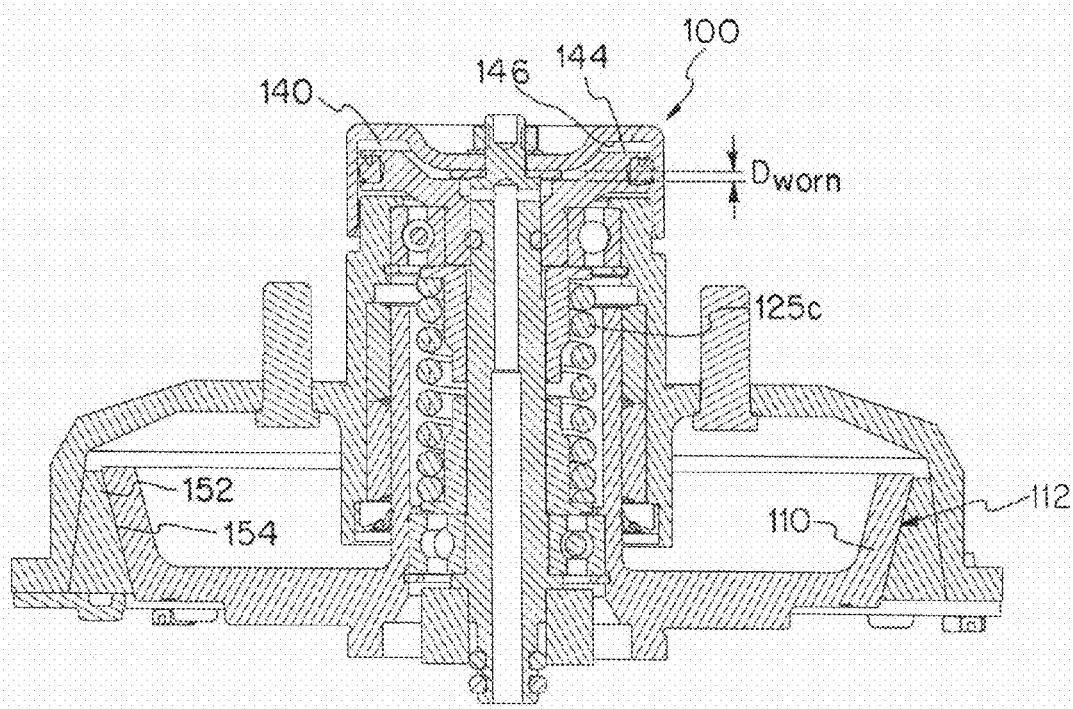
FIG. 5 is a cross-sectional side view of the clutch device of FIG. 3.

Referring now to FIG. 5, when the clutch device 100 is in a worn condition and the clutch device is engaged, with the force of the spring 125c pushing the engagement surface 154 into the opposing friction surface 112, the space D has a length $D_{worn}$ in the axial direction between the front face 144 and the rear face 146.

The axial length of this space D may correspond to an axial thickness of the friction interface including the friction ring 152 and the input member 110. As shown in FIG. 4, when the clutch device 100 is in the new condition, the axial thickness of the friction interface may result in space D having a length $D_{new}$. When the clutch device is in the worn condition, shown in FIG. 5, the reduced axial thickness of the friction interface may result in space D having a shorter length $D_{worn}$.

As the amount of wear increases in the friction interface between the input member 110 and the friction ring 152, the axial length of the space D between the front face 144 and the rear face 146 when the clutch device 100 is engaged, may decrease. As shown in FIGS. 4 and 5, the axial length $D_{new}$ for the clutch device 100 in a new condition may be greater than the axial length $D_{worn}$ for the clutch device 100 in a worn condition. In various embodiments, $D_{new}$ and $D_{worn}$ each may be between 0.10 inches and 0.30 inches, for example. In other embodiments, $D_{new}$ and $D_{worn}$ each may be between 0.060 inches and 0.15 inches, for example. In other embodiments, $D_{new}$ may be between 0.140 inches and 0.350 inches, for example. In other embodiments, $D_{new}$ may be about 0.1430 inches and $D_{worn}$ may be about 0.0680 inches, for example.

In accordance with the intended operation of the clutch device, a predetermined critical axial length $D_{crit}$ may be defined that corresponds to a threshold wear condition of the friction interface condition beyond which it is desirable to prevent further wear in the friction interface. In an embodiment, $D_{crit}$ may be defined as a predetermined percentage of the length $D_{new}$. Referring to the friction ring 152, a fully worn-out condition may be defined in the axial direction, with $D_{crit}$ corresponding to a percentage of fully worn-out, e.g., $D_{crit}$=80% worn-out. In still another embodiment, $D_{crit}$ may be defined as a percentage of the new condition of the friction ring 152, e.g., $D_{crit}$ may correspond to a state in which the friction ring 152 has a thickness in the axial direction that is 20% of its new thickness. In an embodiment, the critical axial length $D_{crit}$=$D_{worn}$=about 0.0680 inches.

Figure 6:
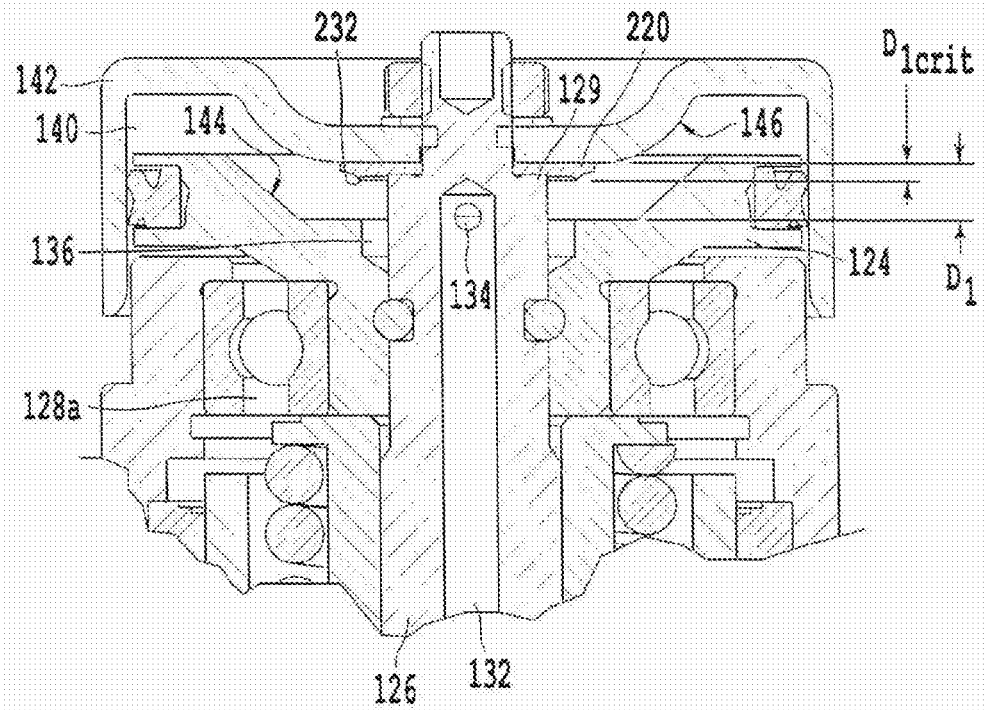
FIG. 6 is an enlarged sub-view of the clutch device of FIG. 3.

Referring now to FIGS. 6-10, in accordance with a first embodiment shown in FIG. 6, as long as an axial length of a space $D_1$ remains above the first critical length $D_{1crit}$, when the pressurized fluid is provided in the fluid channel 132, the fluid may flow out the fluid passage 134 comprised in the central shaft 126, into a fluid trough 136 comprised in the piston 124, past a sealing ridge 232 of a seal 220, into the fluid receiving chamber 140, and across the front face 144 of the piston 124. In the fluid receiving chamber 140, the pressurized fluid may apply a pressure to the rear face 146 of the nose cap 142 and to the front face 144 of the piston 124. The pressure may result in a force on the piston 124, causing the forward bearing 128a to adjust in an axially rearward direction, creating a narrow gap between the engagement surface 154 (shown in FIG. 3) of the friction ring 152 and the friction surface 112, thereby permitting the output member 120 to rotate relative to the input member 110, disengaging the clutch device 100.

In various embodiments, the rear face 146 of the nose cap 142 may have a substantially flat inner radial portion and a substantially flat outer radial portion connected by a beveled or curved intermediate portion, as shown in FIG. 6. In other embodiments, the rear face 146 may form a substantially flat surface. Similarly, the front face 144 may have a substantially flat inner radial portion and a substantially flat outer portion connected by a beveled or curved intermediate portion, as shown in FIG. 6. In other embodiments, the front face 144 may form a substantially flat surface.

Figure 7:
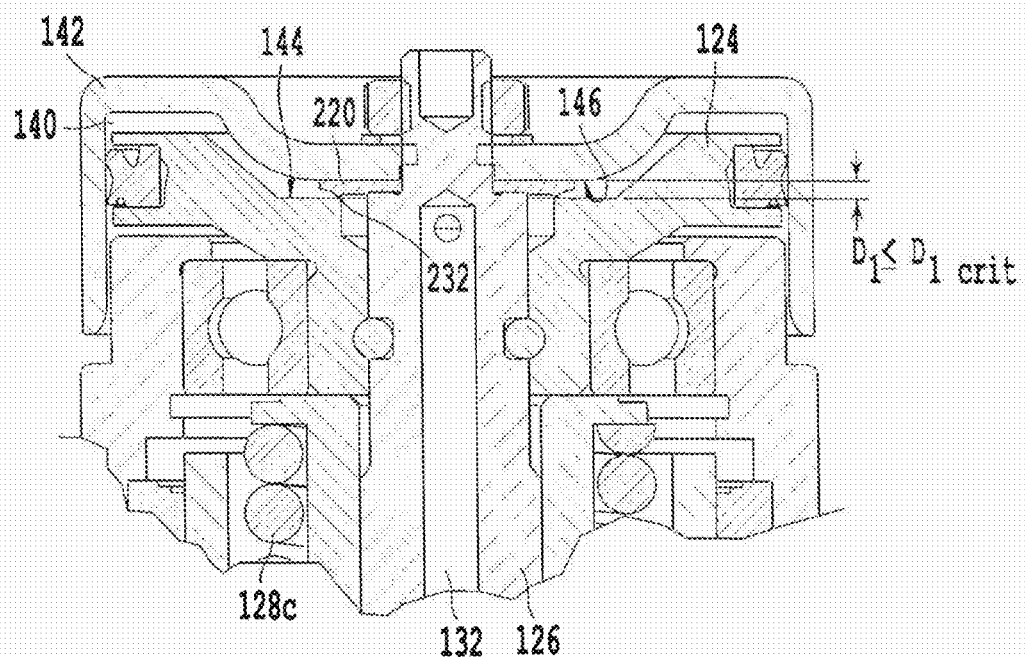
FIG. 7 is an enlarged sub-view of the clutch device of FIG. 3.

Referring now to FIG. 7, when the axial length of the space $D_1$ is less than or equal to the first critical length $D_{1crit}$ and the fluid receiving chamber 140 is not pressurized, the force of the spring 128c may compress the sealing ridge 232 in the axial direction between the rear face 146 and the front face 144. Thereafter, when the pressurized fluid is provided in the fluid channel 132, the pressurized fluid may not flow past the sealing ridge 232 of the seal 220. Consequently, the pressurized fluid may exert pressure only on a small portion of the front face 144 and the resultant force in the axial direction may be insufficient to overcome the force of the spring 128c on the piston 124. Thus, when the sealing ridge 232 is compressed in the axial direction between the rear face 146 and the front face 144, this may prevent the piston 124 from being displaced in the axial direction away from the nose cap 142, even when the pressurized fluid is provided in the fluid channel 132. Accordingly, movement of the friction ring 152 to the disengaged position may be prevented in response to the friction ring 152 wearing down below a threshold thickness, without user intervention or external controls. Thus, the clutch device 100 may be said to have an auto-stop feature.

Referring now to FIG. 8, the seal 220 in accordance with a first embodiment may have a substantially toroidal body 222 including a sealing ridge 232, enabling the seal 220 to be installed around the central shaft 126 in the fluid receiving chamber 140, as shown for example in FIG. 6. Referring to FIGS. 8 and 9, the body 222 of the seal 220 according to the first embodiment may have a front surface 224, a rear surface 226, an inner radial portion 228, and an outer radial portion 229.

The three-dimensional shape of the substantially toroidal body 222 may be understood in terms of a two-dimensional cross-section revolved about an axis of symmetry, as illustrated in FIGS. 9-13.

Referring to FIG. 10, the first embodiment may include a seal having a cross-sectional area 1010 that includes a generally rectangular region 1020 and a rear ridge profile 1030. The generally rectangular region 1020 may have a radially inward end 1022 located toward an axis of revolution 1005, a radially outward end 1024 located away from the axis of revolution 1005, a front edge 1026, and a rear edge 1028. The front edge 1026 may connect the radially inward end 1022 to the radially outward end 1024. The rear edge 1028 may likewise connect the radially inward end 1022 to the radially outward end 1024.

Still referring to FIG. 10, the rear ridge profile 1030 may extend from the rear edge 1028. The rear ridge profile 1030 may be located on a portion of the rear edge 1028 located toward the radially outward end 1024. In some embodiments, the rear ridge profile 1030 may have a generally trapezoidal shape. In other embodiments, the rear ridge profile 1030 may have another shape. In some embodiments, the intersections 1032 of the rear ridge profile 1030 with the rear edge 1028, where the ridge profile 1030 extends from the rear edge 1028 may include a filet or a chamfer.

Referring now to FIG. 11, other embodiments may include a seal having a cross-sectional area 1110 that includes a generally rectangular region 1120, a rear ridge profile 1130, and a generally circular region 1140. The generally rectangular region 1120 may have a radially inward end 1122 located toward an axis of revolution 1105, a radially outward end 1124 located away from the axis of revolution 1105, a front edge 1126, and a rear edge 1128. The front edge 1126 may connect the radially inward end 1122 to the radially outward end 1124. The rear edge 1128 may likewise connect the radially inward end 1122 to the radially outward end 1124.

Still referring to FIG. 11, the rear ridge profile 1130 may extend from the rear edge 1128. The rear ridge profile 1130 may be located on a portion of the rear edge 1128 located toward the radially outward end 1124.

Still referring to FIG. 11, the generally circular region 1140 may be located toward the radially inward end 1122 such that the front edge 1126 and the rear edge 1128 intersect the generally circular region 1140. A rear curve 1142 of the generally circular region 1140 may extend in the axial direction beyond the rear edge 1128. As already discussed, the rear ridge profile 1130 may extend in the axial direction from the rear edge 1128. The rear ridge profile 1130 may extend from the rear edge 1128 further in the axial direction than the rear curve 1142 extends beyond the rear edge 1128.

Referring now to FIG. 12, other embodiments may include a seal having a cross-sectional area 1210 that includes a generally rectangular region 1220, a rear ridge profile 1230, a generally circular region 1240, and a front ridge profile 1250. The generally rectangular region 1220 may have a radially inward end 1222 located toward an axis of revolution 1205, a radially outward end 1224 located away from the axis of revolution 1205, a front edge 1226, and a rear edge 1228. The front edge 1226 may connect the radially inward end 1222 to the radially outward end 1224. The rear edge 1228 may likewise connect the radially inward end 1222 to the radially outward end 1224.

Still referring to FIG. 12, the rear ridge profile 1230 may extend from the rear edge 1228. The rear ridge profile 1230 may be located on a portion of the rear edge 1228 located toward the radially outward end 1224.

Still referring to FIG. 12, the generally circular region 1240 may be located toward the radially inward end 1222 such that the front edge 1226 and the rear edge 1228 intersect the generally circular region 1240. A rear curve 1242 of the generally circular region 1240 may extend in the axial direction beyond the rear edge 1228. As already discussed, the rear ridge profile 1230 may extend in the axial direction from the rear edge 1228. The rear ridge profile 1230 may extend from the rear edge 1228 further in the axial direction than the rear curve 1242 extends beyond the rear edge 1228. A front curve 1244 of the generally circular region 1240 may extend in the axial direction beyond the front edge 1226.

Still referring to FIG. 12, the front ridge profile 1250 may extend from the front edge 1226. As already discussed, the front curve 1244 may extend in the axial direction beyond the front edge 1226. The front ridge profile 1250 may extend from the front edge 1226 in the axial direction a distance substantially equal to a distance by which the front curve 1244 extends in the axial direction beyond the front edge 1226. The front ridge profile 1250 may be located on a portion of the front edge 1226 located toward the radially outward end 1224. In some embodiments, the front ridge profile 1250 may have a trapezoidal shape, while in other embodiments, the front ridge profile 1250 may have another shape.

Referring now to FIG. 13, other embodiments may include a seal having a cross-sectional area 1310 that includes a generally rectangular region 1320, a rear ridge profile 1330, a generally circular region 1340, a first front ridge profile 1350, and a second front ridge profile 1360. The generally rectangular region 1320 may have a radially inward end 1322 located toward an axis of revolution 1305, a radially outward end 1324 located away from the axis of revolution 1305, a front edge 1326, and a rear edge 1328. The front edge 1326 may connect the radially inward end 1322 to the radially outward end 1324. The rear edge 1328 may likewise connect the radially inward end 1322 to the radially outward end 1324.

Still referring to FIG. 13, the rear ridge profile 1330 may extend from the rear edge 1328. The rear ridge profile 1330 may be located on a portion of the rear edge 1328 located toward the radially outward end 1324.

Still referring to FIG. 13, the generally circular region 1340 may be located toward the radially inward end 1322 such that the front edge 1326 and the rear edge 1328 intersect the generally circular region 1340. A rear curve 1342 of the generally circular region 1340 may extend in the axial direction beyond the rear edge 1328. As already discussed, the rear ridge profile 1330 may extend in the axial direction from the rear edge 1328. The rear ridge profile 1330 may extend from the rear edge 1328 further in the axial direction than the rear curve 1342 may extend beyond the rear edge 1328. A front curve 1344 of the generally circular region 1340 may extend in the axial direction beyond the front edge 1326.

Still referring to FIG. 13, the first front ridge profile 1350 may extend from the front edge 1326. The first front ridge profile 1350 may be located on a portion of the front edge 1326 located toward the radially outward end 1324. The second front ridge profile 1360 may also extend from the front edge 1326. As already discussed, the front curve 1344 may extend in the axial direction beyond the front edge 1326. The first front ridge profile 1350 and the second front ridge profile 1360 may both extend from the front edge 1326 in the axial direction a distance substantially equal to a distance by which the front curve 1344 extends in the axial direction beyond the front edge 1326. A portion of the cross-sectional area 1310 located radially between the first front ridge profile 1350 and the second front ridge profile 1360 may define a concave profile 1370.

According to various embodiments, the rear ridge profile 1030, 1130, 1230, 1330, revolved about the axis of revolution 1005, 1105, 1205, 1305 may form the sealing ridge 232. In some embodiments, the sealing ridge 232 may have a tapered shape, narrowing as the sealing ridge 232 extends from the rear surface 226. This tapered shape may advantageously engage with an adjacent surface, thereby sealing against a flow of the pressurized fluid.

A seal 220 according to any of the embodiments shown in FIGS. 10-13 may be installed as shown, for example, in FIG. 6. The inner radial portion 228 may be deformed when put into use, for example, by being placed in compression between the nose cap 142 and a shoulder portion 129 of the central shaft 126. The inner radial portion 228 may be stretched over a forward end 131 of the central shaft 126, the forward end 131 having a radius greater than an un-stretched radius of the inner radial portion 228 of the seal 220. The seal 220 may also be fixed in place, for example, by a bonding agent disposed between the front surface 224 of the seal 220 and the rear face 146 of the nose cap 142.

Referring to FIGS. 11-13, the inner radial portion 228 of the seal 220 may have a substantially circular cross-section 1140, 1240, 1340, this configuration being adapted to seal against fluid leaks when deformed. The inner radial portion 228 that extends in the axial direction beyond the front surface 224 and beyond the rear surface 226 may receive an axial compression load, as when clamped between the nose cap 142 and the shoulder portion 129 of the central shaft 126. This axial compression may deform the inner radial portion 228, thereby effectively preventing the pressurized fluid from leaking out the central opening 148 of the nose cap 142.

The inner radial portion 228 may be stretched over a forward end 131 of the central shaft 126, the forward end 131 having a diameter greater than an un-stretched inner diameter of the inner radial portion 228. When deformed in this way, the inner radial portion 228 may effectively prevent the pressurized fluid from leaking out the central opening 148 of the nose cap 142.

In some embodiments, the fluid trough 136 of the piston 124 may extend in the radial direction surrounding the central shaft 126, thereby providing fluid communication between the fluid passage 134 and the fluid receiving chamber 140. According to the first embodiment, the seal 220 may extend in a radial direction further than the fluid trough 136 of the piston 124, so that when the friction ring 152 wears down to a threshold thickness, the sealing ridge 232 compresses, surrounding the fluid trough 136, automatically stopping the clutch device 100 from disengaging. Thus, in some embodiments, a single seal 220 may both prevent the pressurized fluid from leaking out the central opening 148 and provide the auto-stop feature.

Moreover, in some embodiments, one or more front ridge profiles 1250, 1350, 1360, revolved about the axis of revolution, may form front sealing ridges that further reduce or prevent the pressurized fluid from leaking out the central opening 148.

In some embodiments, the body 222 of the seal 220 may be thin (having a small axial height) and wide (having a large radial dimension). Thus, the seal body 222 may be subject to bending due to the oscillating motion of the piston 144 and the motion of the pressurized fluid over the surfaces of the seal 220. Accordingly, in some embodiments, the body 222 of the seal 220 may include a stiffener portion (not shown), and an elastomeric portion (not shown) bonded to the stiffener portion. The stiffener portion may comprise one or more materials, such as steel, for example. The elastomeric portion may comprise one or more materials, such as rubber, for example.

Figure 14:
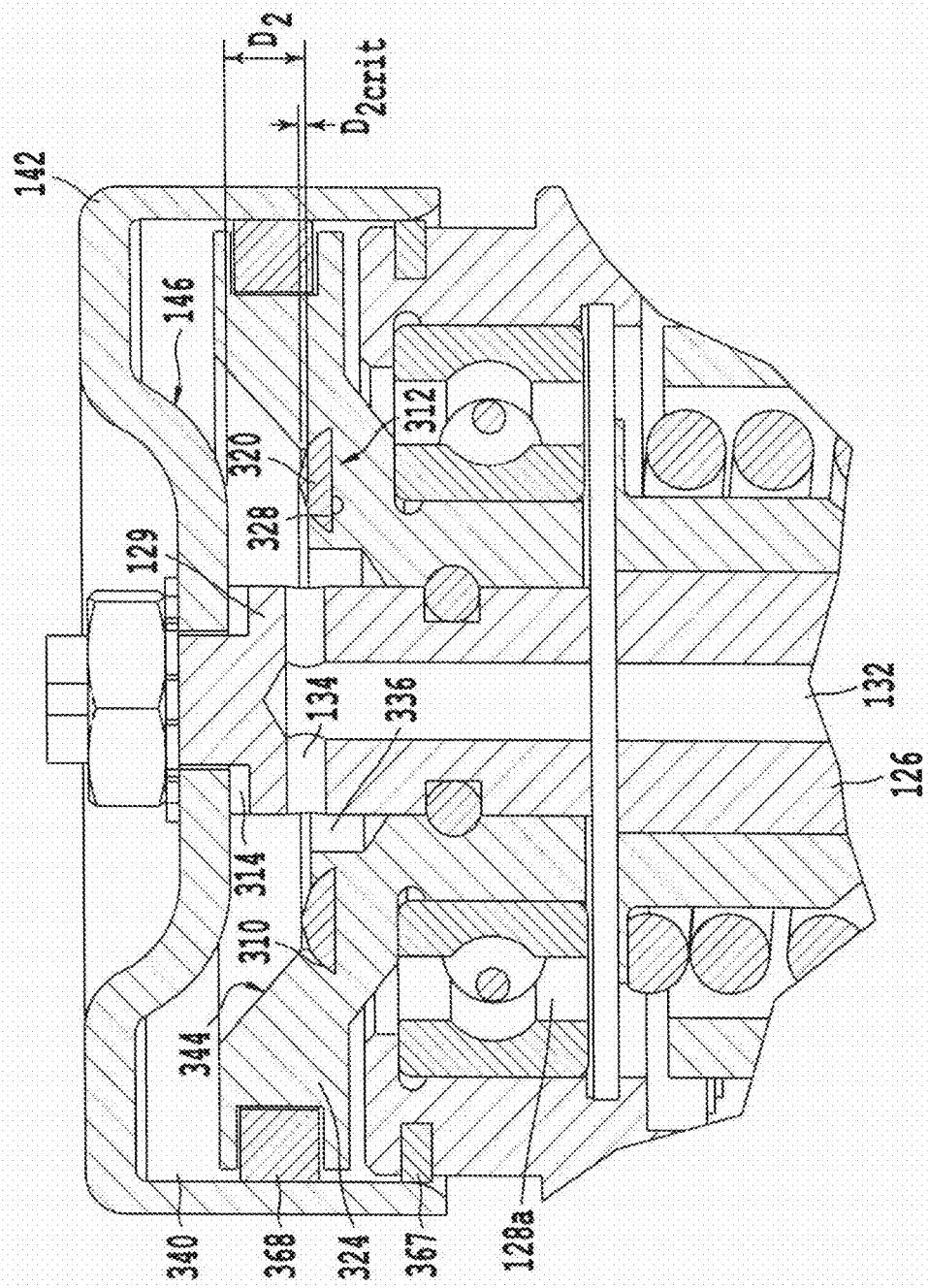
FIG. 14 is an enlarged view of a second embodiment of the clutch device of the clutch system of FIG. 2.

Referring now to FIG. 14, and in accordance with a second embodiment, as long as an axial length of a space $D_2$ between the rear face 146 of the nose cap 142 and a front face 344 of a piston 324 remains above a second critical length $D_{2crit}$, when the pressurized fluid is provided in the fluid channel 132, the pressurized fluid may flow out the fluid passage 134 comprised in the central shaft 126, into a fluid trough 336 comprised in the piston 324, past a seal 320, into a fluid receiving chamber 340, and across the front face 344 of the piston 324. The fluid may apply a pressure to the rear face 146 of the nose cap 142 and to the front face 344 of the piston 324. The pressure may result in a force on the piston 324, causing the forward bearing 128a to adjust in the axially rearward direction, creating a narrow gap between the engagement surface 154 of the friction ring 152 and the friction surface 112 (as shown in FIG. 3 with respect to the first embodiment), thereby permitting the output member 120 to rotate relative to the input member 110.

Still referring to FIG. 14, a shoulder seal 314 may have a substantially annular shape with a cross-section adapted to seal against fluid leaks when deformed. The shoulder seal 314 may be installed in compression between the nose cap 142 and the shoulder portion 129 of the central shaft 126. The shoulder seal 314 may be stretched over a forward end 131 of the central shaft 126, the forward end 131 having a diameter greater than an un-stretched inner diameter of the shoulder seal 314. The shoulder seal 314 may also be fixed in place, for example, by a bonding agent disposed between the shoulder seal 314 and the rear face 146 of the nose cap 142.

Still referring to FIG. 14, the seal 320 may be made of an elastomer, for example, or of another material or combination of materials that is suitable for acting as a fluid seal. The shoulder seal 314 likewise may be made of an elastomer, for example, or of another material or combination of materials that is suitable for acting as a fluid seal.

Still referring to FIG. 14, some embodiments of the clutch device 100 may include a groove pocket 310 in the front face 344 of the piston 324. The groove pocket 310 may fixedly attach the seal 320 to the piston 324. The seal 320 may be installed in the fluid receiving chamber 140 with a surface 328 of the seal 320 disposed in the groove pocket 310. In an embodiment, the seal 320 may be fixed in place using a friction fit. In another embodiment, the seal 320 may be fixed in place by a bonding agent disposed between one or more surfaces of the seal 320 and adjacent surfaces of the groove pocket 310 and/or the front face 344. In some embodiments, the groove pocket 310 may have a substantially toroidal shape defined by a cross-sectional area revolved about an axis of revolution, the cross-sectional area including a generally trapezoidal region 312. The generally trapezoidal region 312 may have a dovetail shape. In some embodiments, the cross-sectional area of the substantially toroidal groove pocket 310 may include a profile corresponding to a cross-sectional profile of a substantially toroidal body of the seal 320.

Referring now to FIG. 15, the seal 320 in accordance with the second embodiment may have a substantially toroidal body 322 including a sealing ridge 332, enabling the seal 320 to be installed around the central shaft 126, as shown for example in FIG. 14. The three-dimensional shape of the substantially toroidal body 322 of the seal 320 may be understood in terms of a two-dimensional cross-section revolved about an axis of revolution, as illustrated in FIGS. 16-21.

Referring now to FIG. 17, a seal 320 in accordance with the second embodiment may have a cross-sectional area 1710 that includes a generally trapezoidal region 1720 and a front ridge profile 1730. The generally trapezoidal region 1720 may have a radially inward lateral edge 1722 located toward an axis of revolution 1705, a radially outward lateral edge 1724 located away from the axis of revolution 1705, a front base 1726, and a rear base 1728. The front base 1726 may connect the radially inward lateral edge 1722 to the radially outward lateral edge 1724. The rear base 1728 may likewise connect the radially inward lateral edge 1722 to the radially outward lateral edge 1724.

Still referring to FIG. 17, the front ridge profile 1730 may extend from the front base 1726. In some embodiments, the front ridge profile 1730 may include two or more line segments 1732.

Referring now to FIG. 18, other embodiments may include a seal 320 having a cross-sectional area 1810 that includes a generally trapezoidal region 1820 and a front ridge profile 1830. The generally trapezoidal region 1820 may have a radially inward lateral edge 1822 located toward an axis of revolution 1805, a radially outward lateral edge 1824 located away from the axis of revolution 1805, a front base 1826, and a rear base 1828. The front base 1826 may connect the radially inward lateral edge 1822 to the radially outward lateral edge 1824. The rear base 1828 may likewise connect the radially inward lateral edge 1822 to the radially outward lateral edge 1824.

Still referring to FIG. 18, the front ridge profile 1830 may extend from the front base 1826. The front ridge profile 1830 may include two line segments 1832. In some embodiments, the radially inward lateral edge 1822 may form an angle of 90 degrees or less with the rear base 1828. Likewise, in some embodiments, the radially outward lateral edge 1824 may form an angle of 90 degrees or less with the rear base 1828.

Referring now to FIG. 19, other embodiments may include a seal 320 having a cross-sectional area 1910 that includes a generally trapezoidal region 1920 and a front ridge profile 1930. The generally trapezoidal region 1920 may have a radially inward lateral edge 1922 located toward an axis of revolution 1905, a radially outward lateral edge 1924 located away from the axis of revolution 1905, a front base 1926, and a rear base 1928. The front base 1926 may connect the radially inward lateral edge 1922 to the radially outward lateral edge 1924. The rear base 1928 may likewise connect the radially inward lateral edge 1922 to the radially outward lateral edge 1924.

Still referring to FIG. 19, the front ridge profile 1930 may extend from the front base 1926. In some embodiments, the front ridge profile 1930 may include a smooth curve 1932 that is tangent with the radially inward lateral edge 1922 and with the radially outward lateral edge 1922.

Referring now to FIG. 20, other embodiments may include a seal 320 having a cross-sectional area 2010 that includes a generally trapezoidal region 2020, a front ridge profile 2030, a first rear ridge profile 2040, a second rear ridge profile 2050, and a concave profile 2060. The generally trapezoidal region 2020 may have a radially inward lateral edge 2022 located toward an axis of revolution 2005, a radially outward lateral edge 2024 located away from the axis of revolution 2005, a front base 2026, and a rear base 2028. The front base 2026 may connect the radially inward lateral edge 2022 to the radially outward lateral edge 2024. The rear base 2028 may likewise connect the radially inward lateral edge 2022 to the radially outward lateral edge 2024.

Still referring to FIG. 20, the front ridge profile 2030 may extend from the front base 2026. In some embodiments, the front ridge profile 2030 may include a flat front edge 2032 that is substantially perpendicular to the axis 2005.

Still referring to FIG. 20, the first rear ridge profile 2040 may extend from the rear base 2028. The first rear ridge profile 2040 may be located on a portion of the rear base 2028 located toward the radially inward lateral edge 2022. The second rear ridge profile 2050 may extend from the rear base 2028. The second rear ridge profile 2050 may be located on a portion of the rear base 2028 located toward the radially outward lateral edge 2024. The concave profile 2060 may exist in a portion of the cross-sectional area 2010 located radially between the first rear ridge profile 2040 and the second rear ridge profile 2050.

Referring now to FIG. 21, other embodiments may include a seal 320 having a cross-sectional area 2110 that includes a generally trapezoidal region 2120, a front ridge profile 2130, a first rear ridge profile 2140, a second rear ridge profile 2150, and a concave profile 2160. The generally trapezoidal region 2120 may have a radially inward lateral edge 2122 located toward an axis of revolution 2105, a radially outward lateral edge 2124 located away from the axis of revolution 2105, a front base 2126, and a rear base 2128. The front base 2126 may connect the radially inward lateral edge 2122 to the radially outward lateral edge 2124. The rear base 2128 may likewise connect the radially inward lateral edge 2122 to the radially outward lateral edge 2124.

Still referring to FIG. 21, the front ridge profile 2130 may extend from the front base 2126. In some embodiments, the front ridge profile 2130 may include a smooth curve 2132 that is tangent with the radially inward lateral edge 2122 and with the radially outward lateral edge 2124.

Still referring to FIG. 21, the first rear ridge profile 2140 may extend from the rear base 2128. The first rear ridge profile 2140 may be located on a portion of the rear base 2128 located toward the radially inward lateral edge 2022. The second rear ridge profile 2150 may extend from the rear base 2128. The second rear ridge profile 2150 may be located on a portion of the rear base 2128 located toward the radially outward lateral edge 2124. The concave profile 2160 may exist in a portion of the cross-sectional area 2110 located radially between the first rear ridge profile 2140 and the second rear ridge profile 2150.

The clutch device 100 may operate for numerous cycles of engagement and disengagement before the auto-stop feature comes into play. Accordingly, the seal 320 may need to be able to withstand repeated flowing of the pressurized fluid across the sealing ridge 332 without degrading the effectiveness of the seal. Thus, in some embodiments, the sealing ridge 332 may have a profile characterized by smooth curves 1932, 2132, thereby reducing fluid shear load on the seal body 322. This may also allow a reduction in pumping pressure required to provide the pressurized fluid to the fluid channel 132.

In accordance with some embodiments, the first rear ridge profile 2040, 2140, the second rear ridge profile 2040, 2150, and the concave profile 2060, 2160 may facilitate installation of the seal 320 in the groove pocket 310. In accordance with some embodiments, the first rear ridge profile 2040, 2140, the second rear ridge profile 2050, 2150, and the concave profile 2060, 2160 may cooperate to give rise to a suction effect on an adjoining surface when the seal is axially compressed. This suction effect may prevent or reduce leaking along the adjoining surface. This suction effect also may help retain the seal in the groove pocket 310.

Advantageously, converting an existing clutch device to include the auto-stop feature may require only a small amount of time and/or cost, involving replacing an existing piston with a piston 324 and a seal 320 in accordance with the second embodiment.

Figure 22:
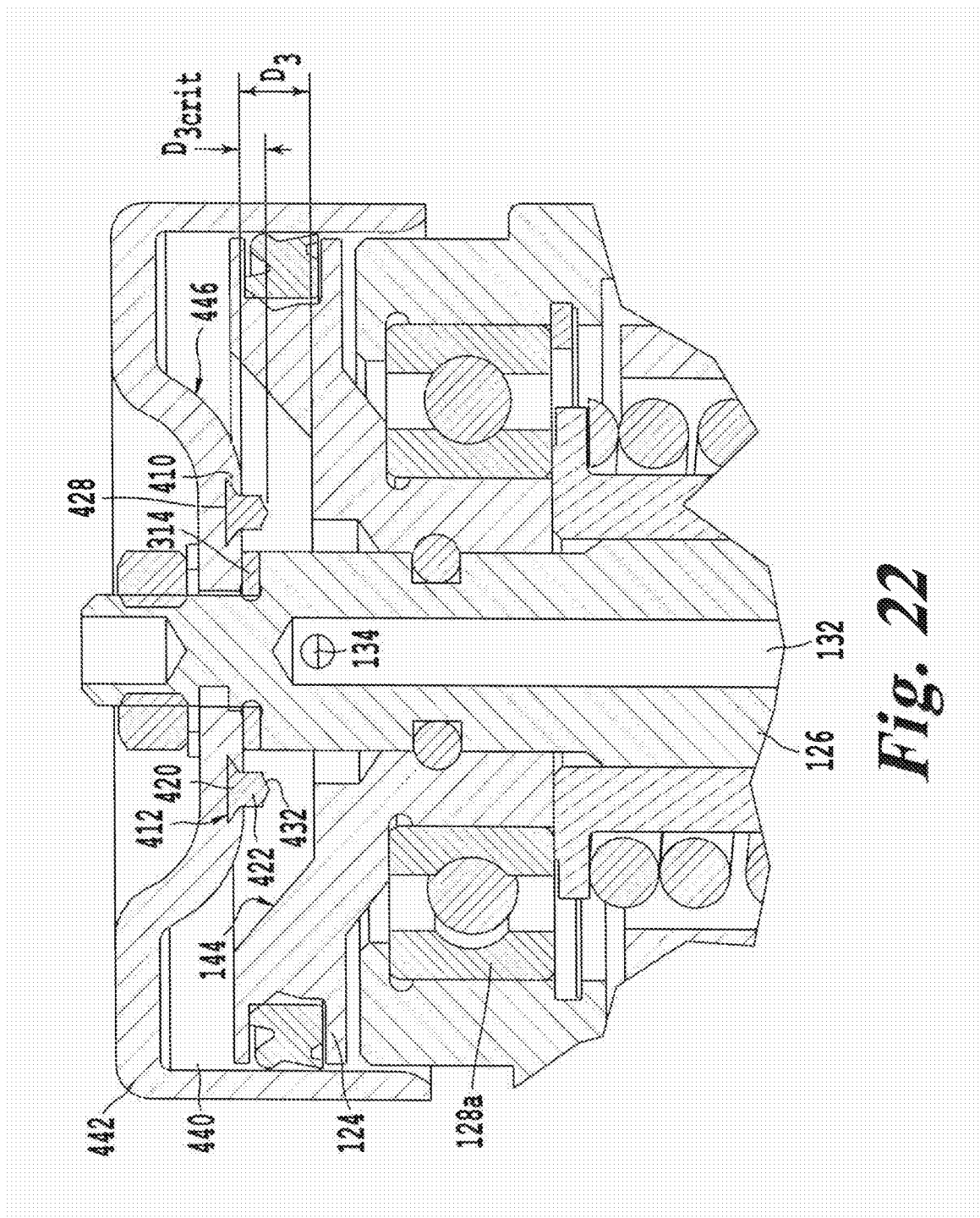
FIG. 22 is an enlarged view of a third embodiment of the clutch device of the clutch system of FIG. 2.

Referring now to FIG. 22, and in accordance with a third embodiment, as long as an axial length of a space $D_3$ between a rear face 446 of a nose cap 442 and the front face 144 of the piston 124 remains above a third critical length $D_{3crit}$, when the pressurized fluid is provided in the fluid channel 132, the pressurized fluid may flow out the fluid passage 134 comprised in the central shaft 126, into the fluid trough 136 comprised in the piston 124, past a seal 420, into a fluid receiving chamber 440, and across the front face 144 of the piston 124. The fluid may apply a pressure to the rear face 446 of the nose cap 442 and to the front face 144 of the piston 124. The pressure may result in a force on the piston 124, causing the forward bearing 128a to adjust in the axially rearward direction, creating a narrow gap between the engagement surface 154 of the friction ring 152 and the friction surface 112 (as shown in FIG. 3 with respect to the first embodiment), thereby permitting the output member 120 to rotate relative to the input member 110.

Still referring to FIG. 22, the seal 420 may have a body 422 including a sealing ridge 432. The shoulder seal 314 may have a substantially annular shape with a cross-section adapted to seal against fluid leaks when deformed. The shoulder seal 314 may be installed in compression between the nose cap 442 and the shoulder portion 129 of the central shaft 126. The shoulder seal 314 may be stretched over a forward end 131 of the central shaft 126, the forward end 131 having a diameter greater than an un-stretched inner diameter of the shoulder seal 314. The shoulder seal 314 may also be fixed in place, for example, by a bonding agent disposed between the shoulder seal 314 and the rear face 146 of the nose cap 142.

Still referring to FIG. 22, the seal 420 may be made of an elastomer, for example, or of another material or combination of materials that is suitable for acting as a fluid seal. The shoulder seal 314 likewise may be made of an elastomer, for example, or of another material or combination of materials that is suitable for acting as a fluid seal. Some embodiments of the clutch device 100 may include a groove pocket 410 in the rear face 446 of the nose cap 442. The groove pocket 410 may fixedly attach the seal 420 to the nose cap 446. The seal 420 may be installed in the fluid receiving chamber 440 with a surface 428 of the seal 420 disposed in the groove pocket 410. In an embodiment, the seal 420 may be fixed in place using a friction fit. In another embodiment, the seal 420 may be fixed in place by a bonding agent disposed between surfaces of the seal 420 and adjacent surfaces of the groove pocket 410 and/or the rear face 446. In some embodiments, the groove pocket 410 may have a substantially toroidal shape defined by a cross-sectional area revolved about an axis of revolution, the cross-sectional area including a generally trapezoidal region 412. The generally trapezoidal region 412 may have a dovetail shape. In some embodiments, the cross-sectional area of the substantially toroidal groove pocket 410 may include a profile corresponding to a cross-sectional profile of a substantially toroidal body of the seal 420.

In another embodiment, the groove pocket 410 may receive a seal 420 having a cross-sectional profile in accordance with those illustrated in FIGS. 17-21 and described above. In accordance with some embodiments, the first rear ridge profile 2040, 2140, the second rear ridge profile 2040, 2150, and the concave profile 2060, 2160 may facilitate installation of the seal 420 in the groove pocket 410. In accordance with some embodiments, the first rear ridge profile 2040, 2140, the second rear ridge profile 2050, 2150, and the concave profile 2060, 2160 may cooperate to give rise to a suction effect on an adjoining surface when the seal is axially compressed. This suction effect may prevent or reduce leaking along the adjoining surface. This suction effect also may help retain the seal in the groove pocket 410.

Advantageously, converting an existing clutch device to include the auto-stop feature may require only a small amount of time and/or cost, involving replacing an existing nose cap with a nose cap 442 and a seal 420 in accordance with the third embodiment.

In some embodiments, the mechanical properties of the material or materials of which the seal 220, 320, 420 is made may relate to the spring force provided by the spring. For example, if the seal is made of a material having a low modulus of elasticity, even a comparatively small spring force may be sufficient to compress the seal, thereby locking the friction ring 152 in the engaged position. Conversely, for a seal made of a material having a high modulus of elasticity, a comparatively large spring force may be required to compress the seal, thereby locking the friction ring 152 in the engaged position. Thus, by varying the material composition of the seal, a clutch device 100 may be enabled to operate with a range of springs providing various levels of spring force.

In like manner, the geometry of the sealing ridge 232, 332, 432 may relate to the spring force provided by the spring and the material or materials of which the seal is made. Notably, in some embodiments, because the sealing ridge 232, 332, 432 extends from the seal body 222, 322, 422, the sealing ridge 232, 332, 432 may have a stiffness greater than, less than, or substantially equivalent to a remainder of the seal body 222, 322, 422. Thus, by varying the shape of the sealing ridge of the seal, a clutch device may be enabled to operate with a range of springs providing various levels of spring force, and the seal may be made of various materials.

Obviously, numerous modifications and variations of the present invention are possible in light of the above teachings. It is therefore to be understood that within the scope of the appended claims, the invention may be practiced otherwise than as specifically described herein.

The invention claimed is:

1. A clutch device comprising:
a central shaft oriented along an axis, the central shaft including a coupling end that receives a pressurized fluid, opposite the coupling end, a forward end that includes a fluid passage, and a fluid channel that provides fluid communication between the coupling end and the fluid passage;
a nose cap attached to the forward end of the central shaft;
a piston slidingly mounted on the central shaft to translate in the axial direction relative to the nose cap;
a spring that urges the piston in the axial direction toward the nose cap;
an output member that receives an output instrument;
a forward bearing that couples the piston with the output member so that the output member is constrained to translate in the axial direction with the piston relative to the central shaft and the output member is substantially free to rotate about the axis relative to the piston;
a rear bearing that rotatingly couples an input member to the central shaft;
a friction ring fixed to rotate about the axis with the output member and to reciprocate with the output member in the axial direction relative to the input member between an engaged position in which the friction ring frictionally engages with an opposing surface of the input member and a disengaged position in which the friction ring is spaced apart from the opposing surface of the input member; and
a seal disposed in the axial direction between a rear face of the nose cap and a front face of the piston and in the radial direction with respect to the axis surrounding the fluid passage of the central shaft, the seal including a sealing ridge that protrudes in the axial direction from a body of the seal and engages at least one of the rear face of the nose cap or the front face of the piston when the friction ring is worn down below a threshold thickness, the seal thereby preventing the pressurized fluid from flowing out the fluid passage, past the sealing ridge, and into a space between the rear face of the nose cap and the front face of the piston, and thereby preventing the friction ring from moving between the engaged position and the disengaged position,
wherein the seal is axially clamped between the nose cap and a shoulder portion of the central shaft.

2. The clutch device of claim 1, wherein the threshold thickness of the friction ring is a pre-determined percent of a new thickness.

3. The clutch device of claim 1, wherein the pressurized fluid is air.

4. A clutch system, comprising:
a drive pulley that rotates about a rotational axis;
the clutch device of claim 1;

an output instrument mounted to the output member of the clutch device so as to rotate when the friction ring is in the engaged position.

5. A clutch device comprising:
a central shaft oriented along an axis, the central shaft including a coupling end that receives a pressurized fluid, opposite the coupling end, a forward end that includes a fluid passage, and a fluid channel that provides fluid communication between the coupling end and the fluid passage;
a nose cap attached to the forward end of the central shaft;
a piston slidingly mounted on the central shaft to translate in the axial direction relative to the nose cap;
a spring that urges the piston in the axial direction toward the nose cap;
an output member that receives an output instrument;
a forward bearing that couples the piston with the output member so that the output member is constrained to translate in the axial direction with the piston relative to the central shaft and the output member is substantially free to rotate about the axis relative to the piston;
a rear bearing that rotatingly couples an input member to the central shaft;
a friction ring fixed to rotate about the axis with the output member and to reciprocate with the output member in the axial direction relative to the input member between an engaged position in which the friction ring frictionally engages with an opposing surface of the input member and a disengaged position in which the friction ring is spaced apart from the opposing surface of the input member; and
a seal disposed in the axial direction between a rear face of the nose cap and a front face of the piston and in the radial direction with respect to the axis surrounding the fluid passage of the central shaft, the seal including a sealing ridge that protrudes in the axial direction from a body of the seal and engages at least one of the rear face of the nose cap or the front face of the piston when the friction ring is worn down below a threshold thickness, the seal thereby preventing the pressurized fluid from flowing out the fluid passage, past the sealing ridge, and into a space between the rear face of the nose cap and the front face of the piston, and thereby preventing the friction ring from moving between the engaged position and the disengaged position,
wherein the body including the sealing ridge of the seal has a substantially toroidal shape defined by a cross-sectional area revolved about an axis of revolution, the cross-sectional area including
a generally rectangular region having
 a radially inward end located toward the axis of revolution,
 a radially outward end located away from the axis of revolution, and
 front and rear edges that connect the radially inward and radially outward ends; and
a rear ridge profile that extends from the rear edge on a portion of the rear edge located toward the radially outward end.

6. The clutch device of claim 5, wherein the ridge profile has a generally trapezoidal shape.

7. The clutch device of claim 5, wherein the cross-sectional area further includes
a generally circular region having a diameter greater than a height in the axial direction of the generally rectangular region between the front and rear edges,
the generally circular region being located toward the radially inward end such that the front and rear edges intersect the generally circular region, and
a rear curve of the generally circular region extending in the axial direction beyond the rear edge such that the rear ridge profile extends from the rear edge further in the axial direction than the rear curve extends beyond the rear edge.

8. The clutch device of claim 7, wherein the cross-sectional area further includes
a first front ridge profile that extends from the front edge on a portion of the front edge located toward the radially outward end,
and a front curve of the generally circular region that extends in the axial direction beyond the front edge,
the first front ridge profile extending from the front edge in the axial direction a distance substantially equal to a distance by which the front curve of the generally circular region extends in the axial direction beyond the front edge.

9. The clutch device of claim 8, wherein the cross-sectional area further includes
a second front ridge profile that extends from the front edge,
the second front ridge profile extending from the front edge in the axial direction a distance substantially equal to the distance by which the front curve of the generally circular region extends in the axial direction beyond the front edge, and
a portion of the cross-sectional area located radially between the first and second front ridge profiles defining a concave profile.

10. The clutch device of claim 5, wherein the seal is axially clamped between the nose cap and a shoulder portion of the central shaft.

11. A clutch system, comprising:
a drive pulley that rotates about a rotational axis;
the clutch device of claim 5;
an output instrument mounted to the output member of the clutch device so as to rotate when the friction ring is in the engaged position.

12. A clutch device comprising:
a central shaft oriented along an axis, the central shaft including a coupling end that receives a pressurized fluid, opposite the coupling end, a forward end that includes a fluid passage, and a fluid channel that provides fluid communication between the coupling end and the fluid passage;
a nose cap attached to the forward end of the central shaft;
a piston slidingly mounted on the central shaft to translate in the axial direction relative to the nose cap;
a spring that urges the piston in the axial direction toward the nose cap;
an output member that receives an output instrument;
a forward bearing that couples the piston with the output member so that the output member is constrained to translate in the axial direction with the piston relative to the central shaft and the output member is substantially free to rotate about the axis relative to the piston;
a rear bearing that rotatingly couples an input member to the central shaft;
a friction ring fixed to rotate about the axis with the output member and to reciprocate with the output member in the axial direction relative to the input member between an engaged position in which the friction ring frictionally engages with an opposing surface of the input member and a disengaged position in which the friction ring is spaced apart from the opposing surface of the input member; and a seal disposed in the axial direction between a rear face of the nose cap and a front face of the piston and in the radial direction with respect to the axis surrounding the fluid passage of the central shaft, the seal including a sealing ridge that protrudes in the axial direction from a body of the seal and engages at least one of the rear face of the nose cap or the front face of the piston when the friction ring is worn down below a threshold thickness, the seal thereby preventing the pressurized fluid from flowing out the fluid passage, past the sealing ridge, and into a space between the rear face of the nose cap and the front face of the piston, and thereby preventing the friction ring from moving between the engaged position and the disengaged position, wherein the body including the sealing ridge of the seal has a substantially toroidal shape defined by a cross-sectional area revolved about an axis of revolution, the cross-sectional area including a generally trapezoidal region having
 a radially inward lateral edge located toward the axis of revolution,
 a radially outward lateral edge located away from the axis of revolution, and
 substantially parallel front and rear bases that connect the radially inward and radially outward lateral edges; and a front ridge profile that extends from the front base.

13. The clutch device of claim 12, wherein a groove pocket fixedly attaches the seal to the nose cap.

14. The clutch device of claim 13, wherein the groove pocket has a substantially toroidal shape defined by a cross-sectional area revolved about an axis of revolution, the cross-sectional area including a generally trapezoidal region.

15. The clutch device of claim 12, wherein the seal is fixedly attached to the piston so as to move in the axial direction with the piston.

16. The clutch device of claim 15, wherein a groove pocket fixedly attaches the seal to the piston.

17. The clutch device of claim 16, wherein the groove pocket has a substantially toroidal shape defined by a cross-sectional area revolved about an axis of revolution, the cross-sectional area including a generally trapezoidal region.

18. The clutch device of claim 12, wherein the cross-sectional area further includes
 a first rear ridge profile that extends from the rear base on a portion of the rear base located toward the radially outward lateral edge and
 a second rear ridge profile that extends from the rear base on a portion of the rear base located toward the radially inward lateral edge,
 a portion of the cross-sectional area located radially between the first and second rear ridge profiles defining a concave profile.

19. A clutch system, comprising:
 a drive pulley that rotates about a rotational axis;
 the clutch device of claim 12;
 an output instrument mounted to the output member of the clutch device so as to rotate when the friction ring is in the engaged position.

* * * * *